Patented Oct. 24, 1950

2,526,742

UNITED STATES PATENT OFFICE 2,526,742

KETONES FROM SECONDARY ALCOHOLS, OLEFINIC COMPOUNDS, AND CARBON MONOXIDE

William F. Gresham and Richard E. Brooks, Wilmington, Del., assignors to E. I. du Pont de Nemours & Company, Wilmington, Del., a corporation of Delaware No Drawing. Application December 20, 1945, Serial No. 636,262

14 Claims. (Cl. 260—586)

This invention relates to the synthesis of organic oxygen-containing compounds and in particular, to the synthesis of ketones by reaction between secondary alcohols, organic compounds containing olefinic unsaturation, and carbon monoxide.

Heretofore, ketones such as acetone, diethyl ketone and the like have been prepared by dehydrogenation of secondary alcohols in the presence of dehydrogenation catalysts at elevated temperatures.

An object of this invention is to provide a novel and relatively inexpensive process for the preparation of oxygen-containing compounds, especially ketones such as acetone, diethyl ketone, and the like. A further object of the invention is to provide a relatively simple method for the manufacture of ketones at lower temperatures than has been required in the heretofore available processes. A still further object of the invention is to provide a method for the manufacture of ketones without the use of vapor phase dehydrogenation catalysts of the type heretofore required. Other objects and advantages of the invention will appear hereinafter.

These objects are accomplished in accordance with the invention by reacting secondary alcohols with organic unsaturated compounds containing olefinic unsaturation and carbon monoxide at elevated temperature under superatmospheric pressure in the presence of a hydrogenation catalyst. The reaction whereby ketones are produced in accordance with the invention may be illustrated, in particular embodiments, by means of the following equations:

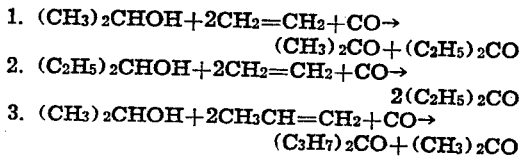

It is believed that the process represented by the above equations is entirely novel and that no prior art exists pertaining thereto. It was particularly surprising to discover that the processes represented by the equations give rise to ketones in yields approaching the maximum theoretically obtainable.

The temperatures employed in the practice of the invention are generaly within the range of about 100° to 500° C., preferably about 225° to 300° C. Superatmospheric pressures are generally employed, preferably pressures exceeding about 50 atmospheres. In general, optimum results are obtained within the range of about 350 to 1500 atmospheres. Higher pressures, up to 3000 atmospheres or more, may be employed if desired.

In the synthesis of oxygen-containing organic compounds in accordance with this invention, any known hydrogenation catalyst may be employed, such as cobalt, nickel, manganese, chromium, copper, platinum, molybdenum, palladium, ruthenium, and compounds of combinations thereof, in the presence or absence of inert materials, promoters, or supports such as, kieselguhr, pumice, silica, $ThO_2$, Mn, etc. In general, inorganic acids ($BF_3$, $HCl$, $NH_4Cl$, and the like) and other catalysts which may preferentially produce ester, etc., are to be avoided. Excellent results are obtained with catalysts which contain cobalt, such as metallic cobalt or soluble cobalt compounds, e. g., cobaltous propionate, or other cobalt salts of organic carboxylic acids. A catalyst which was found to give a virtually quantitative yield of ketone, was copper-chromium-silica. The amount of hydrogenation catalyst employed in batchwise operation is preferably about 0.05 to 10.0% of the total weight of the reaction mixture. Polymerization inhibitors such as hydroquinone may be employed effectively to prevent loss of the reacting substances to polymeric products.

If desired, any inert liquid may be employed as a reaction medium, although the reaction generally proceeds satisfactorily in the absence of an added medium. The catalyst may be dispersed or dissolved in the reaction mixture, or the mixture may be contacted with a fixed or moving catalyst, if desired.

The unsaturated compounds containing olefinic unsaturation which may be used in accordance with this invention are the olefinic hydrocarbons and other organic compounds containing a (i. e., at least one) non-benzenoid double bond between carbon atoms. Suitable examples of such compounds are the olefinic hydrocarbons themselves, e. g. ethylene, alkyl-substituted ethylenes (such as propylene, butene-2, isobutylene, pentene-1, tetramethyl ethylene, diisobutylene, and cracked gasoline fractions), cyclohexene, butadiene, isoprene, polymerized dienes, styrene, alpha-methyl styrene, vinyl cyclohexene, pinene, limonene, mixed olefines or olefine fractions obtainable by cracking and/or dehydrogenation of petroleum, cyclohexadiene, dicyclopentadiene; unsaturated oxygenated compounds such as allyl alcohol, allyl acetate, allyl ethers, methallyl alcohol, vinyl acetate, furan, methyl methacrylate, methyl acrylate, methallyl propionate, methyl oleate, methyl vinyl ketone, methyl vinyl ether, cyclohexene carboxylic acids, esters of cyclohexene carboxylic acids, (such as methylΔ³-tetrahydro benzoate), methallyl methacrylate, acrolein; and, in general, the unsaturated hydrocarbons, esters, ethers, carboxylic acids, amides, aldehydes and ketones containing non-benzenoid olefinic unsaturation.

Any secondary alcohol may be employed in the practice of the invention. Suitable secondary alcohols are isopropanol, secondary butanol, cyclohexanol, and mixed secondary alcohols such as the higher molecular weight secondary alcohols obtained in the hydrogenation of carbon monoxide under elevated temperatures and pressures.

In general, the ratio of the reactants may be varied widely, but in many instances it is desirable to employ an excess of the secondary alcohol and carbon monoxide, since otherwise there is an appreciable tendency for the ethylene to be converted to solid or semi-solid polymers. The molar ratio of secondary alcohol: ethylene, for maximum yield of ketone is preferably 1:1 to 20:1.

The invention is illustrated further by means of the following examples.

*Example 1.*—A mixture containing 150 grams of isopropanol, 10 grams of cobaltous propionate and 14 grams of ethylene was heated at a temperature of 250° to 261° C. for 30 minutes under a carbon monoxide pressure of 625 to 755 atmospheres. The resulting product was a mixture of acetone and diethyl ketone.

*Example 2.*—A mixture containing 150 grams of isopropanol, 14 grams of ethylene, 0.5 gram of cobaltous propionate and 10 grams of reduced cobalt oxide was heated at a temperature of 250° to 262° C. for 15 minutes under a carbon monoxide pressure of 505 to 725 atmospheres. A virtually theoretical conversion to acetone and diethyl ketone was obtained.

*Example 3.*—A mixture containing 150 grams of cyclohexanol, 14 grams of ethylene and 10 grams of metallic cobalt was heated at a temperature of 235° to 250° C. for 27 minutes under a carbon monoxide pressure of 595 to 740 atmospheres. Conversion to diethyl ketone was 70% of the theoretical; the higher boiling products contained an appreciable quantity of cyclohexanone.

*Example 4.*—A mixture containing 150 grams of isopropanol, 10 grams of a catalyst having the composition 100 Cu:5 Cr:10 $SiO_2$ (molal ratios), was heated with 14 grams of ethylene for 30 minutes at a temperature of 215° to 228° C. under a carbon monoxide pressure of 490 to 700 atmospheres. A virtually quantitative yield of acetone and diethyl ketone was obtained.

*Example 5.*—A mixture containing 142 grams of isopropanol, 10 grams of the Cu—Cr—$SiO_2$ catalyst mentioned in Example 4, and 21 grams of propylene was heated at a temperature of 245° to 255° C. for 30 minutes under a carbon monoxide pressure of 675 to 740 atmospheres. Distillation of the resulting product gave a fraction (weight, 28 grams; B. P., 129° to 135° C.) which evidently was a mixture containing ketone and ester. One of the constituents of this mixture was n-propyl isopropyl ketone, which was identified by means of its semicarbazide, M. P., 127° to 128° C. The presence of ester was shown by the fact that the fraction had a saponification number of 247.

It is to be understood that the foregoing examples are illustrative only and that many methods of practicing the invention will occur to those who are skilled in the art. As illustrated in Example 5, products other than ketones are sometimes obtained in the practice of the invention. Esters, for example, may be produced in accordance with the equation $$ROH + CO + ethylene \rightarrow ROCOC_2H_5$$

in which R represents the alkyl group of a secondary alcohol. This reaction may take place, of course, with olefines other than ethylene. In the copending application S. N. 629,698, filed November 19, 1945, it is disclosed that such a reaction occurs almost exclusively when a primary alcohol is subjected to reaction with carbon monoxide and an olefin in the presence of cobalt or similar catalysts at elevated temperatures and pressures.

The present invention may be practiced by heating the reactants in any suitable pressure-resistant vessel, such as an autoclave or tubular converter, preferably made of or lined with inert materials, such as glass, porcelain, inert metals, and the like. The process may be conducted either batchwise or continuously. In the continuous process, the reactants may be introduced at one or more points within the reaction vessel. If desired, in certain instances, it is preferred to employ a tubular reaction vessel in which the temperature and pressure are not uniform throughout the length of the vessel.

The products obtained in accordance with the invention are widely useful, and are especially valuable as volatile solvents and as intermediates for the manufacture of various organic materials, such as, acrylates, ketenes, etc.

Since many embodiments of the invention may be made without departing from the spirit and scope thereof, it will be understood that we do not limit ourselves except as set forth in the following claims.

We claim:

1. The process which comprises reacting a saturated secondary alcohol with an organic compound containing non-aromatic olefinic unsaturation and carbon monoxide as the sole reactants in the presence of a cobalt-containing catalyst of the class consisting of reduced cobalt oxide hydrogenation catalyst and cobalt salts of organic carboxylic acids, in the absence of an inorganic acidic catalyst, at a pressure exceeding 50 atmospheres and a temperature within the range of 100° to 500° C., and separating ketone from the resultant mixture.

2. The process which comprises reacting a saturated secondary alcohol with an organic compound containing non-aromatic olefinic unsaturation and carbon monoxide as the sole reactants under a pressure exceeding 50 atmospheres in the presence of a cobalt-containing catalyst of the class consisting of reduced cobalt oxide hydrogenation catalyst and cobalt salts of organic carboxylic acids at a temperature within the range of 225° to 300° C. in the absence of an inorganic acidic catalyst, whereby a reaction product containing ketones is produced.

3. The process which comprises reacting a saturated secondary alcohol with an organic compound containing non-aromatic olefinic unsaturation and carbon monoxide as the sole reactants under a pressure within the range of about 350 to 3000 atmospheres in the presence of a cobalt-containing catalyst of the class consisting of reduced cobalt oxide hydrogenation catalyst and cobalt salts of organic carboxylic acids at a temperature within the range of 100° to 500° C., whereby a reaction product containing ketones is produced, said process being conducted in the absence of inorganic acidic catalyst.

4. The process which comprises reacting isopropanol with an organic compound containing non-aromatic olefinic unsaturation and carbon monoxide as the sole reactants under a pressure within the range of about 350 to 3000 atmospheres in the presence of a cobalt-containing catalyst of the class consisting of reduced cobalt oxide hydrogenation catalyst and cobalt salts of organic carboxylic acids at a temperature within the range of 100° to 500° C., whereby a reaction product containing ketones is produced, said process being conducted in the absence of inorganic acidic catalyst.

5. The process which comprises reacting cyclohexanol with an organic compound containing non-aromatic olefinic unsaturation and carbon monoxide as the sole reactants under a pressure within the range of about 350 to 3000 atmospheres in the presence of a cobalt-containing catalyst of the class consisting of reduced cobalt oxide hydrogenation catalyst and cobalt salts of organic carboxylic acids at a temperature within the range of 100° to 500° C., whereby a reaction product containing ketones is produced, said process being conducted in the absence of inorganic acidic catalyst.

6. The process which comprises reacting secondary butanol with an organic compound containing non-aromatic olefinic unsaturation and carbon monoxide as the sole reactants under a pressure within the range of about 350 to 3000 atmospheres in the presence of a cobalt-containing catalyst of the class consisting of reduced cobalt oxide hydrogenation catalyst and cobalt salts of organic carboxylic acids at a temperature within the range of 100° to 500° C., in the absence of an inorganic acidic catalyst, whereby a reaction product containing ketone is produced.

7. The process which comprises reacting a saturated secondary alcohol with an organic compound containing non-aromatic olefinic unsaturation and carbon monoxide as the sole reactants under a pressure within the range of about 350 to 3000 atmospheres in the presence of a cobalt salt of an organic carboxylic acid at a temperature within the range of 100° to 500° C., in the absence of an inorganic acidic catalyst, whereby a reaction product containing ketone is produced.

8. The process which comprises reacting a saturated secondary alcohol with an organic compound containing non-aromatic olefinic unsaturation and carbon monoxide as the sole reactants under a pressure within the range of about 350 to 3000 atmospheres in the presence of a catalytic quantity of metallic cobalt at a temperature within the range of 100° to 500° C., in the absence of an inorganic acidic catalyst, whereby a reaction product containing ketone is produced.

9. The process which comprises reacting a saturated secondary alcohol with ethylene and carbon monoxide as the sole reactants under a pressure within the range of about 350 to 3000 atmospheres in the presence of a cobalt-containing catalyst of the class consisting of reduced cobalt oxide hydrogenation catalyst and cobalt salts of organic carboxylic acids at a temperature within the range of 100° to 500° C., in the absence of an inorganic acidic catalyst, whereby a reaction product containing ketone is produced.

10. The process which comprises reacting a saturated secondary alcohol with propylene and carbon monoxide as the sole reactants under a pressure within the range of about 350 to 3000 atmospheres in the presence of a cobalt-containing catalyst of the class consisting of reduced cobalt oxide hydrogenation catalyst and cobalt salts of organic carboxylic acids at a temperature within the range of 100° to 500° C., in the absence of an inorganic acidic catalyst, whereby a reaction product containing ketone is produced.

11. The process which comprises reacting a saturated secondary alcohol with isobutylene and carbon monoxide as the sole reactants under a pressure within the range of about 350 to 3000 atmospheres in the presence of a cobalt-containing catalyst of the class consisting of reduced cobalt oxide hydrogenation catalyst and cobalt salts of organic carboxylic acids at a temperature within the range of 100° to 500° C., in the absence of an inorganic acidic catalyst, whereby a reaction product containing ketone is produced.

12. The process which comprises reacting a saturated secondary alcohol with an organic compound containing non-aromatic olefinic unsaturation and carbon monoxide as the sole reactants under a pressure in the range of 350 to 1500 atmospheres in the presence of a cobalt-containing catalyst of the class consisting of reduced cobalt oxide hydrogenation catalyst and cobalt salts of organic carboxylic acids at a temperature of about 225° to 300° C., in the absence of an inorganic acidic catalyst and separating a ketonic reaction product from the resulting mixture.

13. A process for preparing acetone and diethyl ketone which comprises reacting isopropanol with ethylene and carbon monoxide as the sole reactants under a pressure in the range of 350 to 1500 atmospheres in the presence of a cobalt-containing catalyst of the class consisting of reduced cobalt oxide hydrogenation catalyst and cobalt salts of organic carboxylic acids at a temperature of about 225° to 300° C., in the absence of an inorganic acidic catalyst and thereafter separating the said ketones from the resulting mixture.

14. A process for preparing acetone and diethyl ketone which comprises reacting isopropanol with ethylene and carbon monoxide as the sole reactants under a pressure in the range of 350 to 1500 atmospheres in the presence of about 0.05 to 10%, based on the weight of the reaction mixture, of a cobalt-containing catalyst of the class consisting of reduced cobalt oxide hydrogenation catalyst and cobalt salts of organic carboxylic acids, at a temperature of about 225° to 300° C., in the absence of an inorganic acidic catalyst, and thereafter separating the said ketones from the resulting mixture.

WILLIAM F. GRESHAM.
RICHARD E. BROOKS.

REFERENCES CITED

The following references are of record in the file of this patent:

UNITED STATES PATENTS

| Number | Name | Date |
|---|---|---|
| 1,979,717 | Vail | Nov. 6, 1934 |
| 1,984,884 | Lazier | Dec. 18, 1934 |
| 2,058,789 | Herold et al. | Oct. 27, 1936 |
| 2,066,496 | Taylor | Jan. 5, 1937 |
| 2,327,066 | Roelen | Aug. 17, 1943 |

OTHER REFERENCES

Berkman et al., "Catalysis," pages 815, 819, 822, 828, 841, 854 and 856. Copyright 1940 by Reinhold Publishing Corporation, New York.